United States Patent
Akahane et al.

(10) Patent No.: US 12,497,076 B2
(45) Date of Patent: Dec. 16, 2025

(54) CONTROL DEVICE AND CONTROL METHOD

(71) Applicant: TOYOTA JIDOSHA KABUSHIKI KAISHA, Toyota (JP)

(72) Inventors: Makoto Akahane, Yokohama (JP); Yu Nagata, Chofu (JP); Tomokazu Maya, Nagoya (JP); Masaaki Tomiya, Urayasu (JP); Yuko Mineta, Chofu (JP); Kayo Tsumoto, Nisshin (JP); Shinichi Niwa, Nagakute (JP); Satoshi Komamine, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/603,864

(22) Filed: Mar. 13, 2024

(65) Prior Publication Data
US 2024/0416966 A1  Dec. 19, 2024

(30) Foreign Application Priority Data
Jun. 15, 2023  (JP) .................................. 2023-098750

(51) Int. Cl.
*B60W 60/00* (2020.01)

(52) U.S. Cl.
CPC ..... *B60W 60/0025* (2020.02); *B60W 2555/20* (2020.02)

(58) Field of Classification Search
CPC .......... B60W 60/0025; B60W 2555/20; G01H 3/125; H04N 7/147; G05B 19/0423; G05B 2219/25257
See application file for complete search history.

(56) References Cited

U.S. PATENT DOCUMENTS

| | | | | |
|---|---|---|---|---|
| 7,941,189 | B2* | 5/2011 | Miyauchi | H04M 1/6075 704/226 |
| 10,380,987 | B2* | 8/2019 | Benway | H04K 3/43 |
| 2010/0023195 | A1* | 1/2010 | Traster | G01S 15/931 367/99 |
| 2015/0030175 | A1* | 1/2015 | Roggenkamp | G10K 11/002 381/73.1 |
| 2016/0167234 | A1* | 6/2016 | Angle | G05B 15/02 701/2 |
| 2020/0066055 | A1* | 2/2020 | Hermina Martinez | G06T 19/006 |
| 2020/0174480 | A1* | 6/2020 | Trautman | H04W 4/40 |
| 2021/0302178 | A1 | 9/2021 | Tatsumoto et al. | |
| 2023/0206329 | A1* | 6/2023 | Cella | G06Q 20/0855 |
| 2023/0214925 | A1* | 7/2023 | Cella | G06Q 30/06 705/37 |

(Continued)

FOREIGN PATENT DOCUMENTS

JP  2021-162930 A  10/2021

OTHER PUBLICATIONS

Blind as a bat: audible echolocation on small robots (Year: 2023).*

*Primary Examiner* — Masud Ahmed
(74) *Attorney, Agent, or Firm* — Finnegan, Henderson, Farabow, Garrett and Dunner, LLP

(57) ABSTRACT

The control device includes a control unit that acquires information on a distribution of a loudness of sound in an area in which sound is generated, and controls movement of mobility with a conference room moving in the area based on the acquired information on the distribution.

4 Claims, 3 Drawing Sheets

(56) References Cited

U.S. PATENT DOCUMENTS

2023/0286532 A1* 9/2023 Gerrese ............. B60W 60/0013
2024/0420673 A1* 12/2024 Chang ..................... G06F 3/165

* cited by examiner

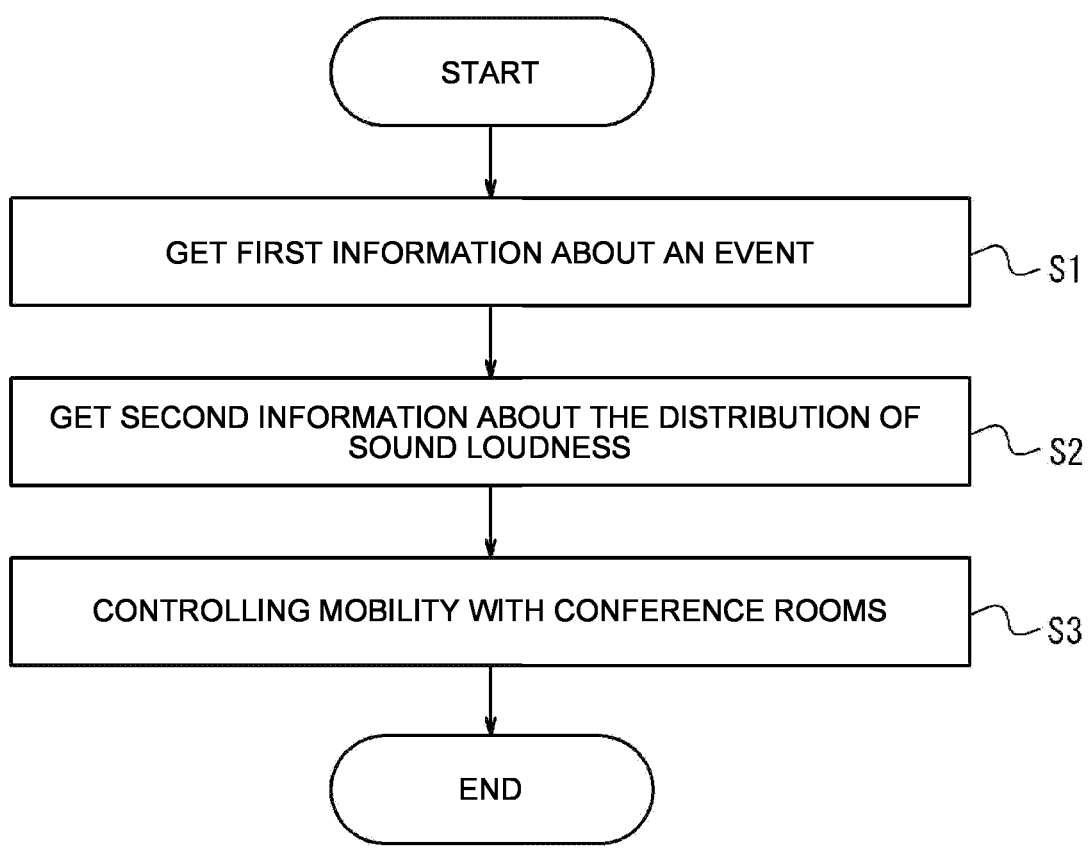

CONTROL DEVICE AND CONTROL METHOD

CROSS-REFERENCE TO RELATED APPLICATION

This application claims priority to Japanese Patent Application No. 2023-098750 filed on Jun. 15, 2023, incorporated herein by reference in its entirety.

BACKGROUND

1. Technical Field

The present disclosure relates to a control device and a control method.

2. Description of Related Art

Japanese Unexamined Patent Application Publication No. 2021-162930 (JP 2021-162930 A) discloses a vehicle that provides a user with a space available as a mobile conference room or a space including soundproofing equipment such as a noise canceller and available as a private room.

SUMMARY

An area such as an event venue where an event is held is noisy. Therefore, it is difficult to secure an environment suitable for a conference.

An object of the present disclosure is to facilitate securing an environment suitable for a conference in an area where sound is generated.

A control device according to the present disclosure includes a control unit configured to:
  acquire information on a distribution of loudness of sound in an area where the sound is generated; and
  control, based on the acquired information on the distribution, movement of mobility including a conference room and configured to move around the area.

A control method according to the present disclosure includes: acquiring, by a control unit, information on a distribution of loudness of sound in an area where the sound is generated; and controlling, by the control unit, based on the acquired information on the distribution, movement of mobility including a conference room and configured to move around the area.

The present disclosure facilitates securing the environment suitable for a conference in the area where sound is generated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating an operation of a control device according to an embodiment of the present disclosure.

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

Figure 1:
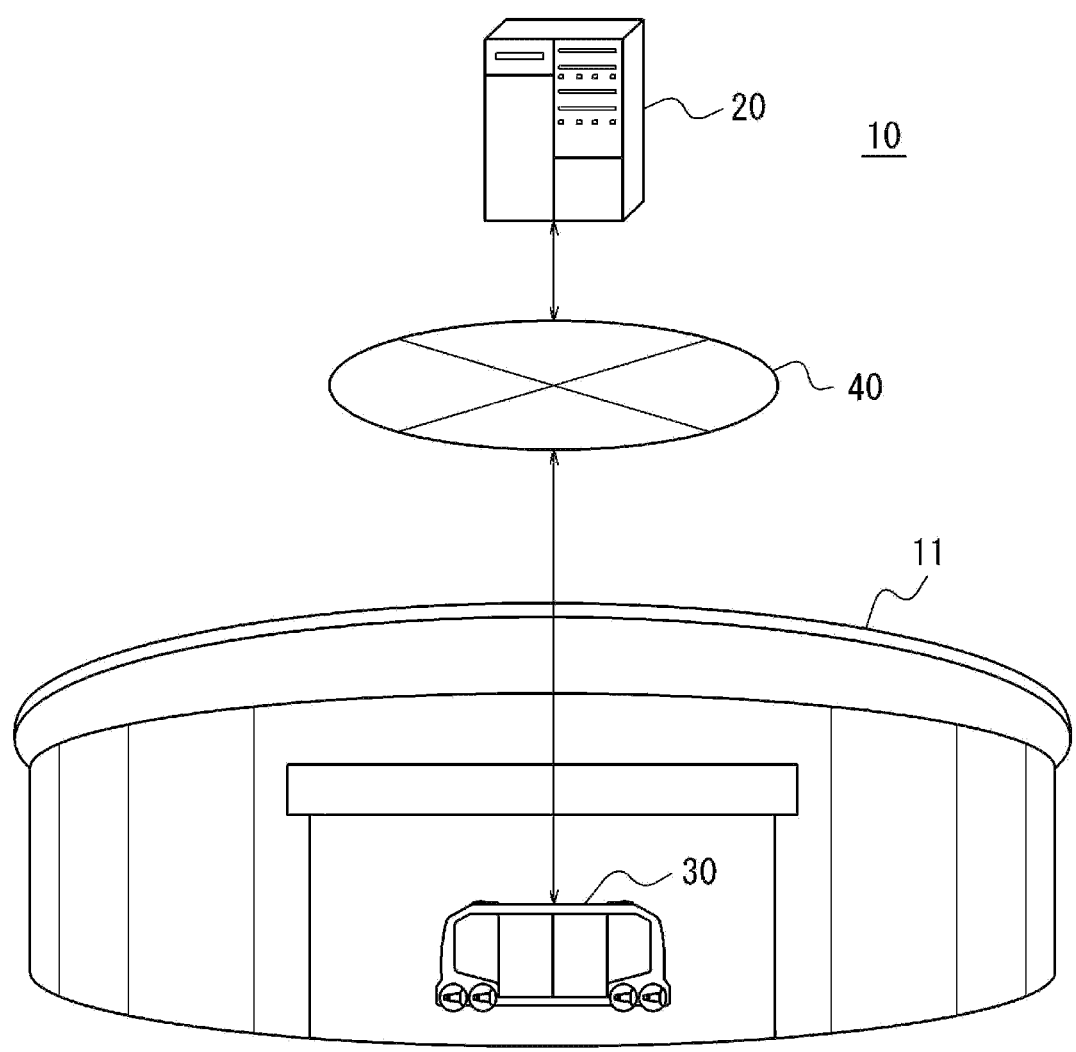
FIG. 1 is a diagram illustrating a configuration of a mobility control system according to an embodiment of the present disclosure.

Referring to FIG. 1, a configuration of a mobility control system 10 according to the present embodiment will be described.

The mobility control system 10 includes a control device 20 and a mobility 30 with a conference room. The control device 20 can communicate with the mobility 30 via the network 40.

The control device 20 is a computer installed in a facility such as a data center. The control device 20 is, for example, a server belonging to a cloud computing system or other computing systems. The control device 20 is operated by, for example, a business operator that operates an event.

Mobility 30 with a conference room is any type of motor vehicle, such as, for example, a gasoline-powered vehicle, a diesel-powered vehicle, a hydrogen-powered vehicle, a HEV, PHEV, BEV, or a FCEV. "HEV" is an abbreviation for hybrid electric vehicle. "PHEV" is an abbreviation for plug-in hybrid electric vehicle. "BEV" is an abbreviation for battery electric vehicle. "FCEV" is an abbreviation for fuel cell electric vehicle. The mobility 30 is AV in this embodiment, but may be driven by a driver or may be automated at any level. AV stands for autonomous vehicle. The level of autonomous driving is, for example, one of levels 1 to 5 in the SAE leveling, for example. "SAE" is an abbreviation for Society of Automotive Engineers. The mobility 30 may be MaaS dedicated vehicles. MaaS is an abbreviation for Mobility as a Service.

The network 40 includes the Internet, at least one WAN, at least one MAN, or any combination thereof. WAN is an abbreviation for wide area network. MAN is an abbreviation for metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation for "local area network".

Figure 2:
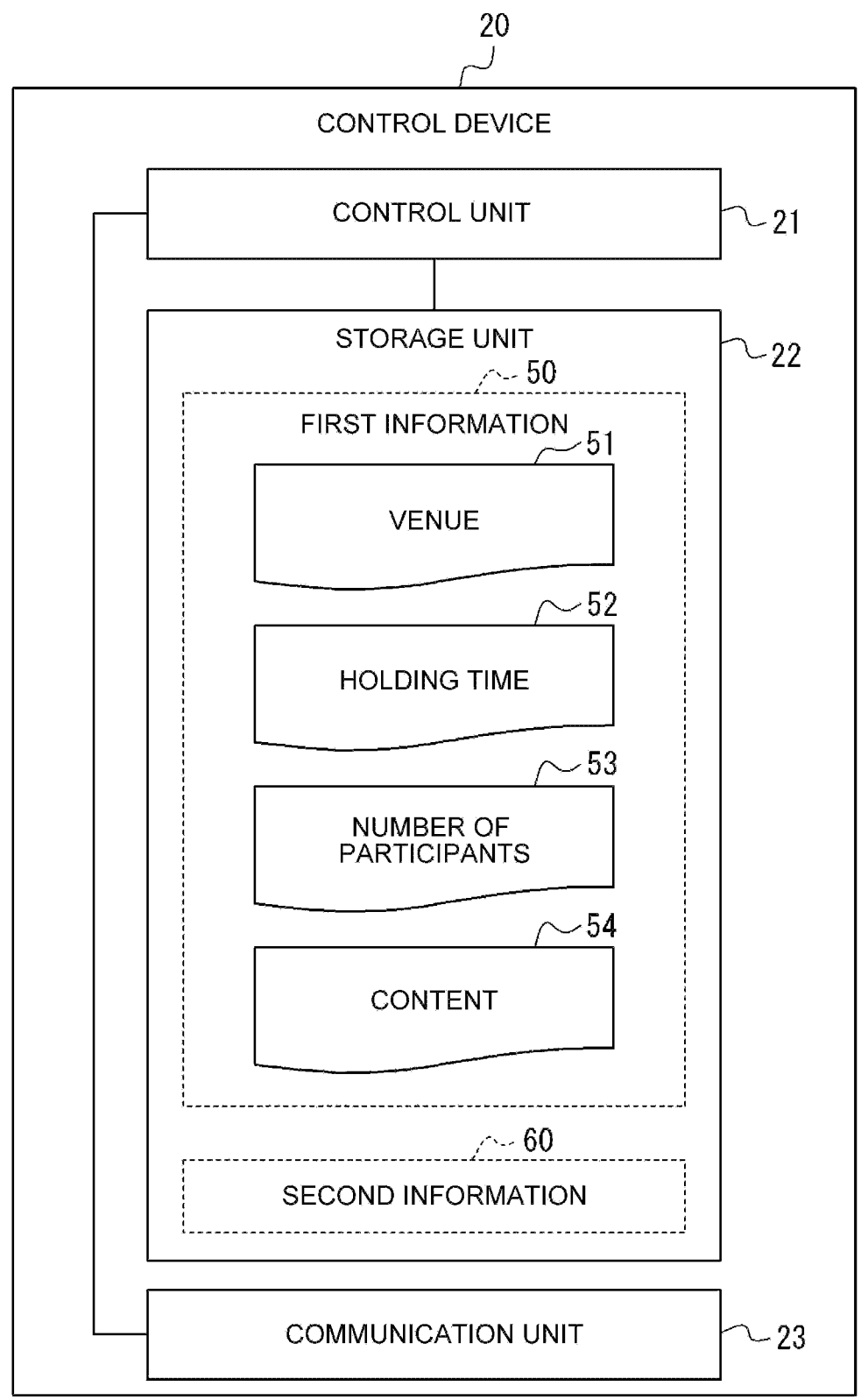
FIG. 2 is a block-diagram illustrating a configuration of a control device according to an embodiment of the present disclosure.

Referring to FIG. 1 and FIG. 2, an outline of the present embodiment will be described.

The control device 20 acquires the second information 60 by the control unit 21. The second information 60 is information about the distribution of the loudness of the sound in the area 11 in which the sound is generated. In the present embodiment, the area 11 is an event hall in which events such as an exhibition, a trade show, a food event, or a product exhibition are held. The event venue is, for example, an arena. The second information 60 is, for example, a noise heat map created by predicting attraction of customers to each booth in the event venue, but may be a noise heat map created by sensing the inside of the event venue. Mobility with conference room 30 moves within area 11. The control device 20 controls the movement of the mobility 30 by the control unit 21 based on the acquired second information 60.

According to the present embodiment, it is easy to secure an environment suitable for a conference in the area 11 in which sound is generated. For example, when a user attempts to conduct an online conference or a telephone conference using a mobile device such as a mobile phone, a smart phone, or a tablet, the surroundings may be annoying. In such a case, the mobility 30 is moved to a quiet place suitable for the conference, so that the user can perform the conference by avoiding noise in the conference room of the mobility 30. The same applies to a case where a plurality of users gather to conduct a conference. In the present embodiment, even if the mobility 30 does not include a soundproofing facility such as a noise canceller, it is possible to provide an environment suitable for a conference with a smaller volume level more easily, and thus it is possible to reduce costs.

According to the present embodiment, it is also possible to provide an on-demand mobile conference room. For increased convenience, information regarding the location of the mobility 30, or information regarding whether the mobility 30 is full or vacant, may be displayed on the user's mobile device, or on a venue bulletin installed in an event venue.

In the present embodiment, the control device 20 acquires the second information 60 by predicting the distribution of the loudness of the sound generated in the future in the area 11. Specifically, the control device 20 acquires the first information 50 by the control unit 21. The first information 50 is information related to an event held in the area 11. Based on the acquired first information 50, the control device 20 predicts the distribution of the loudness of the sound generated in the future in the area 11. Therefore, the control device 20 can avoid moving the mobility 30 to a place where it is likely that a person will be expected to gather after this, even if it is still quiet.

In the present embodiment, the first information 50 includes various kinds of information such as an event venue 51, an event venue 52, a number of participants 53, or contents 54. The first information 50 preferably includes not only past and current information but also future information. That is, it is desirable for the control device 20 to predict the distribution of the magnitudes of sounds generated in the future in the area 11 based on such future information.

As a modification of the present embodiment, the control device 20 may acquire the second information 60 by observing the distribution of the loudness of the sound currently generated in the area 11.

Referring to FIG. 2, a configuration of the control device 20 according to the present embodiment will be described.

The control device 20 includes a control unit 21, a storage unit 22, and a communication unit 23.

The control unit 21 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 21 performs processes related to the operation of the control device 20 while controlling each unit of the control device 20.

The storage unit 22 includes at least one semiconductor memory, at least one magnetic memory, at least one optical memory, or any combination thereof. The semiconductor memory is, for example, a RAM, a ROM, or a flash memory. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read-only memory". The flash memory is, for example, an SSD. "SSD" is an abbreviation for solid-state drive. The magnetic memory is, for example, an HDD. "HDD" is an abbreviation for hard disk drive. The storage unit 22 functions as, for example, a main storage device, an auxiliary storage device, or a cache memory. The storage unit 22 stores the information used for the operation of the control device 20 and the information obtained through the operation of the control device 20. In the present embodiment, at least the first information 50 and the second information 60 are stored in the storage unit 22.

The communication unit 23 includes at least one communication module. The communication module is, for example, a module compliant with a wired LAN communication standard such as Ethernet (registered trademark) or a wireless LAN communication standard such as IEEE802.11. "IEEE" is an abbreviation for Institute of Electrical and Electronics Engineers. The communication unit 23 communicates with the mobility 30. The communication unit 23 receives information used for the operation of the control device 20, and transmits information obtained through the operation of the control device 20.

The function of the control device 20 is realized by executing the program according to the present embodiment with the processor serving as the control unit 21. That is, the function of the control device 20 is realized by software. The program causes the computer to perform the operation of the control device 20 such that the computer functions as the control device 20. That is, the computer functions as the control device 20 by performing the operation of the control device 20 in accordance with the program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. The term "SD" is an abbreviation for "secure digital". The term "DVD" is an abbreviation for "digital versatile disc". The term "CD-ROM" is an abbreviation for "compact disc read-only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

A part or all of the functions of the control device 20 may be realized by a programmable circuit or a dedicated circuit as the control unit 21. That is, a part or all of the functions of the control device 20 may be realized by hardware.

Referring to FIG. 3, the operation of the control device 20 according to the present embodiment will be described. The operation of the control device 20 corresponds to the control method according to the present embodiment. That is, the control methods according to the present embodiment include the steps of S3 from S1 shown in FIG. 3.

In S1, the control unit 21 acquires the first information 50. Specifically, the control unit 21 reads the first information 50 from the storage unit 22. The first information 50 is stored in the storage unit 22 in advance. Alternatively, the first information 50 may be acquired from an external storage via the communication unit 23 and then stored in the storage unit 22.

In S2, the control unit 21 acquires the second information 60. Specifically, the control unit 21 acquires the second information 60 by predicting the magnitude of the sound generated in the future in the area 11 based on the first information 50 acquired by S1. The control unit 21 stores the acquired second information 60 in the storage unit 22. For example, the control unit 21 predicts attraction of customers to each booth in the event venue according to the event venue 51, the event venue 52, the number of participants 53, or the content 54 included in the first information 50. The time at which each booth in the event venue opens, the time at which the event starts at each booth, or in the case of a booth or event under a reservation system, the time of the reservation may be considered. The control unit 21 creates, as the second information 60, a noise heat map indicating that a louder sound is generated in the booth in which more customers are predicted and the periphery of the booth. The control unit 21 may adjust the noise heat map so as to indicate that a loud sound is generated in the booth and the vicinity of the booth in which the generation of a sound of a certain level or more is predicted even if the number of customers is small, such as an event using music being held.

In S3, the control unit 21 controls the mobility 30 with the conference room based on the second information 60 acquired in S2. Specifically, when the control unit 21 detects, based on the second information 60, a location in the area 11 where a sound smaller than the location where the mobility 30 is located is generated, the mobility 30 is moved to the detected location. For example, it is assumed that the noise heat map created by S2 indicates that the volume level at the present position of the mobility 30 is increased in the future. In this case, the control unit 21 instructs the mobility 30 via the communication unit 23 to move to a position indicated by the noise heat map as a place suitable for a conference where the volume level is smaller than the current position.

The steps from S1 to S3 are repeated. Therefore, the control device 20 can cope with changes in the noise level in real time.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A control device comprising a control unit configured to:
   acquire information on a distribution of loudness of sound in an area where the sound is generated;
   control, based on the acquired information on the distribution, movement of a mobility device including a conference room and configured to move around the area; and
   when a location in an area where sound is detected to be lower in volume than in a location where the mobility device is present, based on the acquired information on the distribution, control the mobility device to move to the location in the area where the sound is detected to be lower in volume.

2. The control device according to claim 1, wherein the control unit is configured to acquire the information on the distribution by predicting a distribution of loudness of sound to be generated in the area in a future.

3. The control device according to claim 2, wherein the control unit is configured to:
   acquire information on an event held in the area; and
   predict the distribution of the loudness of the sound to be generated in the area in the future based on the acquired information on the event.

4. A control method comprising:
   acquiring, by a control unit, information on a distribution of loudness of sound in an area where the sound is generated;
   controlling, by the control unit, based on the acquired information on the distribution, movement of a mobility device including a conference room and configured to move around the area; and
   when a location in an area where sound is detected to be lower in volume than in a location where the mobility device is present, based on the acquired information on the distribution, controlling the mobility device to move to the location in the area where the sound is detected to be lower in volume.

* * * * *